Oct. 7, 1930.  W. H. SCHOONMAKER  1,777,480
CLUTCH FOR GEAR SETS
Original Filed Feb. 12, 1927

INVENTOR
William H. Schoonmaker
BY
Frank J. Hunt ATTORNEY

Patented Oct. 7, 1930

1,777,480

UNITED STATES PATENT OFFICE

WILLIAM H. SCHOONMAKER, OF MONTCLAIR, NEW JERSEY

CLUTCH FOR GEAR SETS

Application filed February 12, 1927, Serial No. 167,607. Renewed December 27, 1929.

This invention relates to variable speed transmissions and has special reference to a positive gear clutch for such transmission.

Special objects of the invention are to effect the various changes in speed relations smoothly and easily, without clashing or grinding of gears; to notify the operator of the time the gear changes should be effected and to provide for the foregoing purposes a structure which is quiet and positive in operation, efficient and practical and withal, relatively simple and inexpensive in construction.

The foregoing and other desirable objects are attained by certain novel features of construction, combinations and relations of parts as fully described hereinafter and illustrated in the accompanying drawing.

In the drawing referred to practical embodiments of the invention are illustrated, but as this illustration is primarily for purposes of disclosure it will be understood that various changes and modifications of this structure may be made without departure from the true spirit and scope of the invention as hereinafter defined and broadly claimed.

Figure 1:
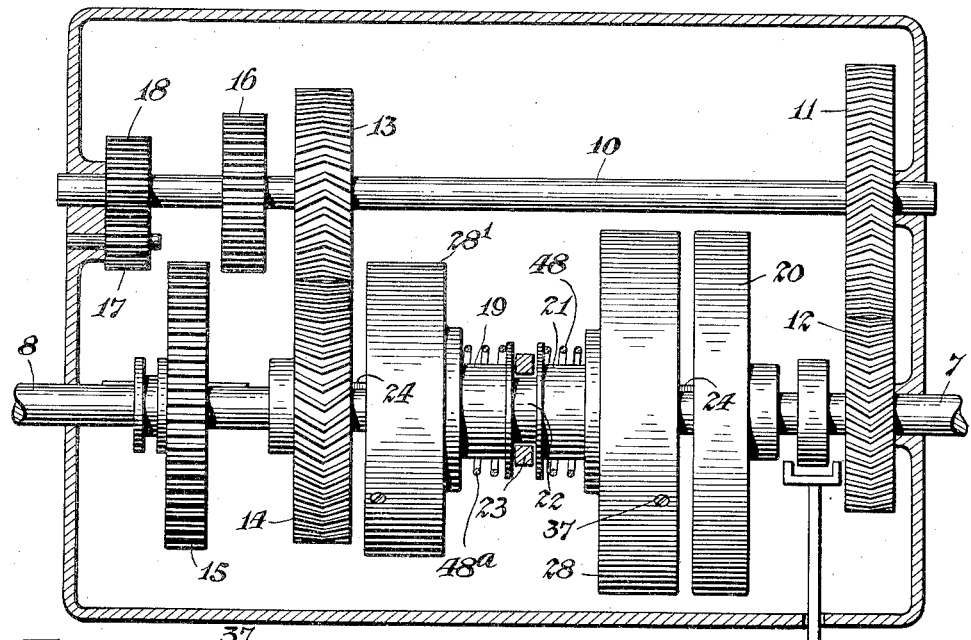
Figure 1 is a sectional view through the case of a transmission unit embodying features of the invention.

In the transmission illustrated the power shaft is indicated at 7 and the driven shaft 8 is shown in axial alinement therewith having a bearing in the end of the power shaft at 9. A jack shaft is shown at 10 carrying a gear 11 on its forward end in mesh with a pinion 12 on the drive shaft. The jack shaft is thus constantly driven from the power shaft. A pinion 13 on the jack shaft meshes with a gear 14 loose on the driven shaft. These two sets of constantly meshed gears 11—12 and 13—14 are shown as of the herringbone type so as to reduce gear sounds to a minimum.

A gear 15 slidably keyed on the driven shaft 8 is shiftable from the neutral position shown in Figure 1 either forwardly into mesh with a pinion 16 on the jack shaft, for what may be termed "first speed" or rearwardly into mesh with a reverse pinion 17 driven from a pinion 18 on the jack shaft.

The "second speed" relation is effected in the illustration by coupling the constantly driven gear 14 with a clutch member 19 keyed on the driven shaft and the "third speed" or direct drive is effected by coupling a clutch member 20 keyed on the power shaft with a clutch member 21 slidably keyed on the driven shaft. The two clutch members 19, 21 being shiftable in reverse directions and both being keyed on the power shaft, are indicated as both forming part of a single sleeve which is grooved intermediate its ends at 22 and engaged by the fork 23 of a suitable shifting lever or slide. The key by which this sleeve is slidingly held on the driven shaft is indicated at 24.

The clutch couplings between parts 14—19 and 20—21 are identical in the present disclosure, except that the former is smaller than the latter, due to the reduction in gearing. A description of one, therefore, will suffice for both.

Figure 2:
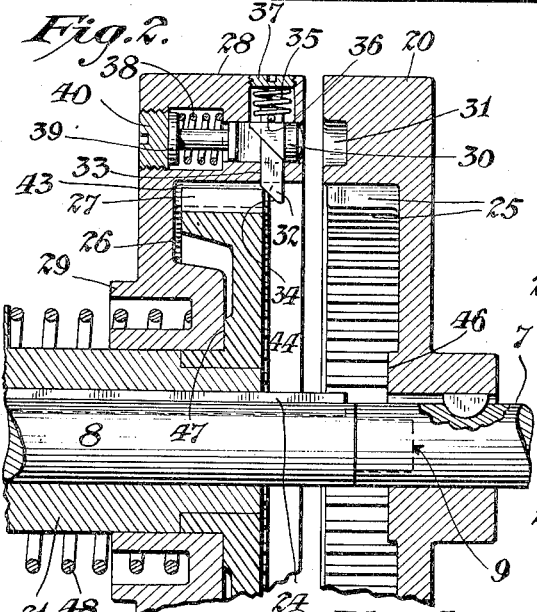
Figures 2 and 3 are broken enlarged sectional views illustrating the members of one clutch pair in disengaged and in engaged relation, respectively.
Figure 3:
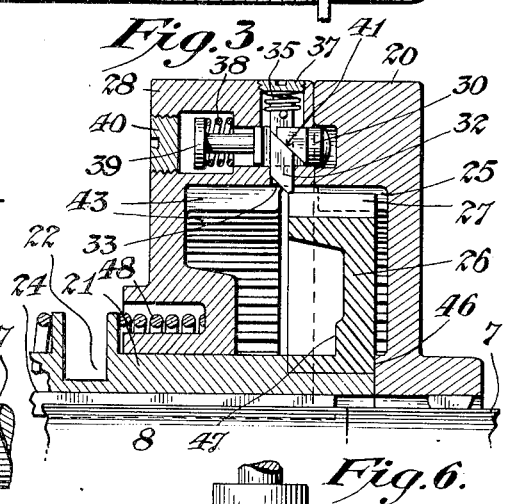

Figures 2 and 3 illustrate in detail the coupling between the driver 20 on the power shaft and the driven sleeve member 21.

The driver 20 is shown formed in the nature of an internal gear having internal gear teeth 25 and the sleeve 21 is shown as having a gear head 26 toothed at 27 to mesh with the teeth 25, Figure 3. The meeting faces of the two sets of gear teeth preferably are tapered or chamfered so that they will glide quietly into engagement.

Preliminary to actual engagement, the driven clutch member is synchronized with the driver and the teeth of one match with the other by "pilot" mechanism disclosed herein as a friction member 28 having a hub 29 revolubly supported on the sleeve 21 and carrying one or more longitudinally extending bolts 30 for entry in pilot openings 31 in the face of the driver, these bolts being controlled by sliding keys or dogs 32. As clearly appears in Figures 2 and 3, the slides are guided in radial passages 33 in the surrounding rim portion of the member 28 and have inclined noses 34 at their inner ends engaging the teeth of the driven clutch member. Springs 35 force the slides inwardly by bearing on the pins 36 on the outer ends of the slides, these springs and the slides themselves being made accessible and removable by means of the screw caps 37 closing the outer ends of the bores in which the slides are located. Pins 36 by engagement with the bolts as in Figure 2 limit the inward movement of the slides 32.

The bolts 30 are retracted by springs 38 seated in the outer ends of the bores in which said bolts are located and bearing against the heads 39 of said bolts. The retracting movements of the bolts are limited by screw caps 40 closing the outer ends of the bores, said screw caps providing also access for removal of the bolts. Cooperating cam shoulders on the bolts and slides are provided for effecting the projection of the bolts, said shoulders being shown as inclined cams 41 on the slides engaging behind inclined shoulders 42 on the bolts.

The clutch gear 26 meshes with and is guided by the internal gear teeth 43 in the pilot member 28, which teeth are set back a sufficient distance from the engaging fact of the pilot member to afford enough clearance at 44 for the clutch gear to pass from engagement with these guide teeth into driven engagement with the teeth 25 in the driver, Figure 3.

In the relation shown in Figure 2, the clutch members are disengaged, the pilot bolts being retracted and the slides projected inwardly over the edges of the movable clutch gear. When the clutch sleeve 21 is shifted to the right, the surrounding pilot member 28 will be carried along with the clutch gear because of the engagement of the slides over the edge of said gear and the face of the pilot member be thereby brought into frictional engagement with the opposing face of the driver. The frictional engagement between these parts will act to bring the pilot member and the enclosed clutch gear which is slidingly keyed therein up to the speed of the driver.

After the face to face engagement of the two members is effected the endwise pressure of the clutch gear becomes operative to force the slides outwardly, which slides thrust the bolts from their seats, causing them to ride over the face of the driver and to enter the seats therein. At the time the bolts enter these seats and the parts are thus brought into actual synchronism, the teeth of the driven clutch gear mesh with the teeth of the driver and the clutching engagement is completed with the driver applying full power through the meshing teeth 25, 27. In the fully meshed relation shown in Figure 3 the teeth 27 of the driven member have left the teeth 43 of the pilot so none of the driving effort is applied through the pilot and the latter is simply carried along with the driver through the medium of the pilot bolts. The bolt seats 31 in the face of the driver are preferably made "oversize" so that the bolts will readily enter the same and so that there will be no real driving force applied through this piloting connection. It will be obvious that the number of bolts 30 and bolt seats 31 may each be varied as desired, and in operation it will be also obvious that owing to the rounded shape of the ends of the bolts 30 as the member 28 is moved by the clutch lever toward the member 20 these bolt ends will contact with the member 20 and spring in and out to a certain extent thus setting up a vibration which is felt by the operator through the gear shift lever. Naturally when these bolts catch in the seats this springing in and out stops and indicates, by the cessation of vibration, that the parts are in position to permit the full shifting of the clutch member.

Figures 4, 5, 6:
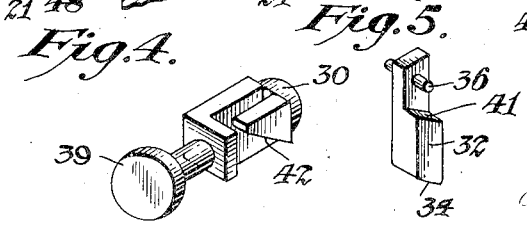
Figures 4 and 5 are detached perspective views of the pilot bolt and the actuating slide therefor respectively.
Figure 6 is an elevation of the clutch members modified to the extent of having wavy opposing faces for effecting a frictional engagement of the same.

This vibration which may be imparted to the gear shift lever through the action of the pilot bolts riding over the face of the driver provides an indication to the operator as to the proper instant the clutch members should be fully shifted to complete the clutching engagement. This indication may be accentuated and made more positive by forming the meeting faces of the two clutch members 20 and 28 on wavy lines as indicated at 45 in Figure 6 so that certain impulses will be imparted from one member to the other until the two arrive at the same speed, whereupon the absence of such impulses will afford a positive indication that the clutch elements are synchronized and ready for complete coupling.

The cooperating clutch members 14, 19 are similar to those described, 14 being the driver with the internal set of drive teeth and 19 being the driven member carrying the clutch gear for engagement with the drive teeth and having mounted on it the piloting member 28' similar in essential respects to the pilot member 28 described. The clutching movement in this case is the reverse of the other, or to the left in Figure 1, and serves when the members are coupled together to effect a so-called second speed relation, with a double gear reduction from the power shaft through the jack shaft back to the driven shaft.

The synchronizing and piloting arrangements disclosed serve to effect smooth, quiet and positive engagement of the clutch gears, the engagement and disengagement can be effected easily and with slight effort and the structures are relatively simple and durable.

The preliminary coupling effected by the synchronizing device provides a readily understood tactable indication as to the instant when the clutch gears are in synchronism and can be directly engaged without clash.

Suitable stops may be provided for regulating the relative movements of the clutch and piloting members. In the illustration a stop shoulder 46 on the hub of the driving member limits the engaging movement of the driven member as indicated in Figure 3, to a position where the slides or dogs 32 will remain in engagement with the gear teeth 27 and a shoulder 47 on the hub of the driven gear element 26 forms a stop for relatively positioning the pilot member in the unclutching movement of the parts.

A yielding thrust connection between the driven member and pilot is illustrated in the form of a spring 48 interposed between the back of the pilot and the shipping collar 22 of the movable clutch member. This spring, as will be clear from Figures 2 and 3, introduces a yielding element in the engagement of the pilot member with the driven clutch member and by its pressure (Figure 3) causes a retention of the piloting coupling while the driven gear element 26 is being withdrawn from the driving gear element 20. This spring in fact thus insures that the piloting coupling will be completed before the clutch gears are meshed and that the clutch gears will be unmeshed before the pilot connection is uncoupled. A similar controlling spring 48ª is shown provided for the other clutch couple illustrated.

What is claimed is:

1. In apparatus of the character disclosed, cooperating toothed clutch members arranged for meshing and unmeshing relation, a synchronizing device carried by one of the clutch members and means automatically operable in the meshing of the toothed clutch members to effect first a frictional coupling and then a positive coupling between the clutch members prior to the actual meshing of the teeth of the clutch members.

2. In clutch mechanism, relatively engageable and disengageable toothed clutch members, a synchronizing device movable with one of said clutch members and having teeth meshing with the teeth of said clutch member, said synchronizing device having means for effecting a synchronizing coupling with the other clutch member and the synchronizing device and the clutch member which carries the same being relatively shiftable to enable the unmeshing of the two and the meshing of said clutch member with the teeth of the companion clutch member.

3. In clutch mechanism, coaxial clutch members relatively shiftable toward and away from each other, one having internal clutch teeth and the other external clutch teeth to mesh the same, a synchronizing device sleeved on the externally toothed clutch member and having internal clutch teeth engageable by the external clutch teeth of said clutch member, said synchronizing device and the internally toothed clutch member having means engaging in the relative clutching movement of the members to effect synchronization prior to the meshing of the externally toothed clutch member with the internally toothed clutch member and said means including a normally retracted pilot bolt carried by the synchronizing device and means operable by movement of the externally toothed clutch member to project said bolt into engagement with the internally toothed clutch member.

4. In clutch mechanism, coaxial clutch members relatively shiftable toward and away from each other, one having internal clutch teeth and the other external clutch teeth to mesh the same, a synchronizing device sleeved on the externally toothed clutch member and having internal clutch teeth engageable by the external clutch teeth of said clutch member, said synchronizing device and the internally toothed clutch member having means engaging in the relative clutching movement of the members to effect synchronization prior to the meshing of the externally toothed clutch member with the internally toothed clutch member and said means including a normally retracted pilot bolt carried by the synchronizing device and means operable by movement of the externally toothed clutch member to project said bolt into engagement with the internally toothed clutch member, said internally toothed clutch member having a seat to receive said pilot bolt and the externally toothed clutch member having a movement clear of the teeth in the synchronizing device to prevent transmission of power by said bolt to the externally toothed clutch member.

5. In clutch mechanism, cooperating clutch parts arranged in opposed relation and having provision for a synchronizing coupling between the two, said clutch parts having corresponding internal clutch teeth in the opposing faces of the same and a coupling clutch member toothed to mesh the internal clutch teeth of said cooperating parts and shiftable from meshed relation with one set of internal clutch teeth into meshed relation with the other set of internal clutch teeth, the two sets of internal clutch teeth being so related to each other and to the coupling clutch member that in the synchronizing coupling of the parts the coupling clutch member will stand entirely clear of one set of the internal clutch teeth.

6. In clutch mechanism, cooperating clutch parts arranged in opposed relation and having provision for a synchronizing coupling between the two, said clutch parts having corresponding internal clutch teeth in the opposing faces of the same and a coupling clutch member toothed to mesh the internal clutch teeth of said cooperating parts and shiftable from meshed relation with one set of internal clutch teeth into meshed relation with the other set of internal clutch teeth, one of said clutch parts being coupled to the shiftable coupling clutch member to thereby follow the movements of the same toward and away from the other clutch part.

7. In clutch mechanism, cooperating clutch parts arranged in opposed relation and having provision for a synchronizing coupling between the two, said clutch parts having corresponding internal clutch teeth in the opposing faces of the same and a coupling clutch member toothed to mesh the internal clutch teeth of said cooperating parts and shiftable from meshed relation with one set of internal clutch teeth into meshed relation with the other set of internal clutch teeth, one of said clutch parts being coupled to the shiftable coupling clutch member to thereby follow the movements of the same toward and away from the other clutch part and said coupling including bolt mechanism for interconnecting the two clutch parts and means for automatically effecting projection and retraction of said bolt mechanism as the clutch parts are approached and separated.

8. In clutch mechanism, cooperating clutch members engageable for synchronizing purposes and having clutch teeth in the opposing faces of the same and a coupling member having clutch teeth to mesh with the clutch teeth of said clutch members and shiftable from a position in mesh with the teeth of one clutch member, clear of said teeth into mesh with the teeth of the other clutch member.

9. In clutch mechanism, coaxial internally and externally toothed clutch members, an internally toothed clutch member sleeved on the externally toothed clutch member and adapted to be carried by the externally toothed member into synchronizing coupled relation with the first mentioned internally toothed clutch member.

10. In clutch mechanism, coaxial internally and externally toothed clutch members, an internally toothed clutch member sleeved on the externally toothed clutch member and adapted to be carried by the externally toothed member into synchronizing coupled relation with the first mentioned internally toothed clutch member and a yieldable connection between the externally toothed clutch member and the member sleeved thereon for causing the latter to follow the movements of the former.

11. In clutch mechanism, coaxial internally and externally toothed clutch members, an internally toothed clutch member sleeved on the externally toothed clutch member and adapted to be carried by the externally toothed member into synchronizing coupled relation with the first mentioned internally toothed clutch member, a yieldable connection between the externally toothed clutch member and the member sleeved thereon for causing the latter to follow the movements of the former and coupling means actuated by said yielding connection.

12. In clutch mechanism, coaxial intermeshing externally and internally toothed clutch members, a synchronizing clutch member having a keyed engagement with the externally toothed clutch member and shiftable with said member into and out of coupled relation with the internally toothed clutch member, and a spring pressed element carried by said synchronizing member and engaging the externally toothed clutch member.

13. In clutch mechanism, coaxial intermeshing externally and internally toothed clutch members, a synchronizing clutch member having a keyed engagement with the externally toothed clutch member and shiftable with said member into and out of coupled relation with the internally toothed clutch member, a spring pressed element carried by said synchronizing member and engaging the externally toothed clutch member and a coupling bolt carried by the synchronizing member and engageable with the internally toothed clutch member under control of said spring pressed element.

14. In clutch mechanism, coaxial driving and driven shafts, cooperating externally and internally toothed clutch members keyed on said shafts and shiftable into and out of meshed relation, a synchronizing device supported to receive the externally toothed clutch member and toothed internally to mesh with the same, said synchronizing device having means to engage the internally toothed clutch member in advance of the engagement of the latter by the externally toothed member and coupling means for causing the synchronizing device to follow the movements of the externally toothed member, the latter means including a spring pressed slide engaging the toothed member.

15. In clutch mechanism, coaxial driving and driven shafts, cooperating externally and internally toothed clutch members keyed on said shafts and shiftable into and out of meshed relation, a synchronizing device supported to receive the externally toothed clutch member and toothed internally to mesh with the same, said synchronizing device having means to engage the internally toothed clutch member in advance of the engagement of the latter by the externally toothed member, coupling means for causing the synchronizing device to follow the movements of the externally toothed member, the latter means including a spring pressed slide engaging the toothed member and a bolt projectible from the synchronizing device into engagement with the internally toothed clutch member, said bolt being controlled by said slide.

16. In clutch mechanism, cooperating clutch members, a synchronizing device shiftable with one of said clutch members, a bolt carried by said synchronizing device and projectible into engagement with the other clutch member, said other clutch member having a seat to receive said bolt and a slide in the synchronizing device for operating said bolt and adapted to be actuated by the clutch member which carries said synchronizing device.

17. In clutch mechanism, cooperating clutch members of the positive type, synchronizing means of the impositive type for automatically bringing the clutch members into synchronism and means directly associated with said synchronizing means for providing a tactable indication of the synchronizing operation and including similar wavy and interfitting engaging faces on the synchronizing device and one of the clutch members respectively.

18. In clutch mechanism, cooperable toothed clutch members, a pilot wheel slidably supported on one of said clutch members, means for limiting the relative shifting movements of the toothed clutch members and pilot wheel, bolts carried by the pilot wheel, members for actuating said bolts held in the predetermined limits of movements of the parts in engagement with the clutch member on which the pilot wheel is mounted.

19. In clutch mechanism, cooperable toothed clutch members, a pilot wheel slidably supported on one of said clutch members, means for limiting the relative shifting movements of the toothed clutch members and pilot wheel, bolts carried by the pilot wheel, members for actuating said bolts held in the predetermined limits of movements of the parts in engagement with the clutch member on which the pilot wheel is mounted and spring means exerting a force to yieldingly retain said clutch member and pilot wheel in a predetermined relation.

In testimony whereof I affix my signature.

WILLIAM H. SCHOONMAKER.